United States Patent [19]

Kim et al.

[11] Patent Number: 4,676,940

[45] Date of Patent: Jun. 30, 1987

[54] PLASMA ARC SINTERING OF SILICON CARBIDE

[75] Inventors: Jonathan J. Kim, Williamsville; Viswanathan Venkateswaran, Grand Island; Richard C. Phoenix, Lewiston, all of N.Y.

[73] Assignee: Kennecott Corporation, Cleveland, Ohio

[21] Appl. No.: 718,375

[22] Filed: Apr. 1, 1985

[51] Int. Cl.$^4$ .................................................. F27B 9/04
[52] U.S. Cl. ............................. 264/65; 156/DIG. 64; 373/18; 373/19; 419/57; 423/345; 432/13; 501/88
[58] Field of Search ........................... 419/57; 501/88; 423/345; 156/DIG. 64; 432/13; 373/18, 19; 264/65

[56] References Cited

U.S. PATENT DOCUMENTS

| Re. 30,286 | 5/1980 | Coppola et al. ..................... 106/44 |
|---|---|---|
| 3,432,296 | 3/1969 | McKinnon et al. .................. 75/214 |
| 3,935,371 | 1/1976 | Camacho et al. ......................... 13/2 |
| 3,970,290 | 7/1976 | Santen et al. ....................... 266/138 |
| 3,977,837 | 8/1976 | Mal et al. ............................ 29/182.7 |
| 4,133,689 | 1/1979 | Stroke ................................... 264/65 |
| 4,141,726 | 2/1979 | Yajima et al. ......................... 75/229 |
| 4,179,299 | 12/1979 | Coppola et al. ..................... 106/44 |
| 4,381,931 | 5/1983 | Hunold et al. ....................... 65/18.1 |
| 4,390,773 | 6/1983 | Esser et al. .................. 219/121 P R |
| 4,462,792 | 7/1984 | Roth et al. ............................. 432/11 |
| 4,501,717 | 2/1985 | Tsukamoto et al. .................. 419/58 |

FOREIGN PATENT DOCUMENTS 0032100 12/1980 European Pat. Off. .
2510986 8/1982 France .

OTHER PUBLICATIONS

"Test Furnace Achieves 2200° C. (4000° F.) in Air, Inert Atmospheres", presented by Harper Electric Furnace Corp., Harper Highlights, vol. 5, No. 1, Spring 85.

Primary Examiner—Stephen J. Lechert, Jr.
Attorney, Agent, or Firm—Pahl, Lorusso & Loud

[57] ABSTRACT

A process for the sintering of silicon carbide refractory or ceramic articles using plasma arc gases. In the process of the invention, a formed silicon carbide article is heated in a plasma fired furnace to a sintering temperature of between 2000° C.–2500° C. at a heating rate of 300° C./hr–2000° C./hr, and held at the sintering temperature for 0.1–2 hours. The enthalpy of the plasma gas is 2000 BTU/lb–4000 BTU/lb, when nitrogen is used as the plasma gas. The total cycle time for the process of the invention, including cooling and loading, is 1.5–20 hours. Silicon carbide articles, produced in accordance with the invention, have high strength, high density, high corrosion resistance and high dimensional stability.

17 Claims, 5 Drawing Figures

500X MAGNIFICATION
SAMPLE FIRED IN PLASMA FURNACE
HEATING RATE 800°C/HR. TO 2325°C
1-1/2 HR. HOLD AT 2325°C
DENSITY 3.143
ATMOSPHERE-NITROGEN

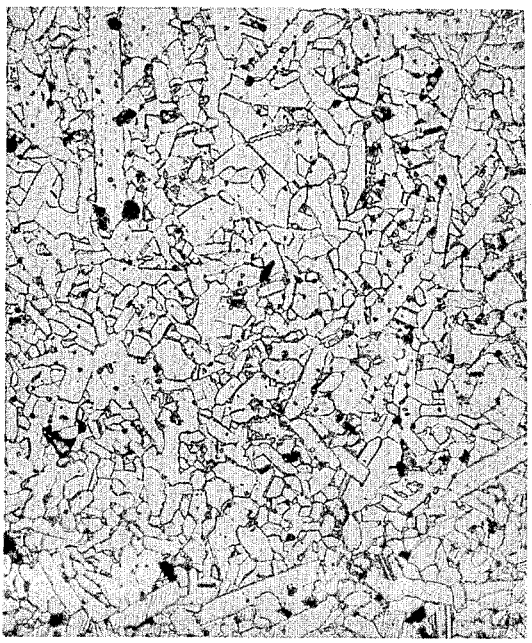
500X MAGNIFICATION
SAMPLE FIRED IN CENTORR FURNACE
HEATING RATE 250° C/HR. TO 2150°C
1-1/2 HR. HOLDING AT 2150° C
DENSITY 3.13
ATMOSPHERE – ARGON
FIG. 1
500X MAGNIFICATION
SAMPLE FIRED IN PLASMA FURNACE
HEATING RATE 800°C/HR. TO 2325°C
1-1/2 HR. HOLD AT 2325°C
DENSITY 3.143
ATMOSPHERE – NITROGEN
FIG. 2
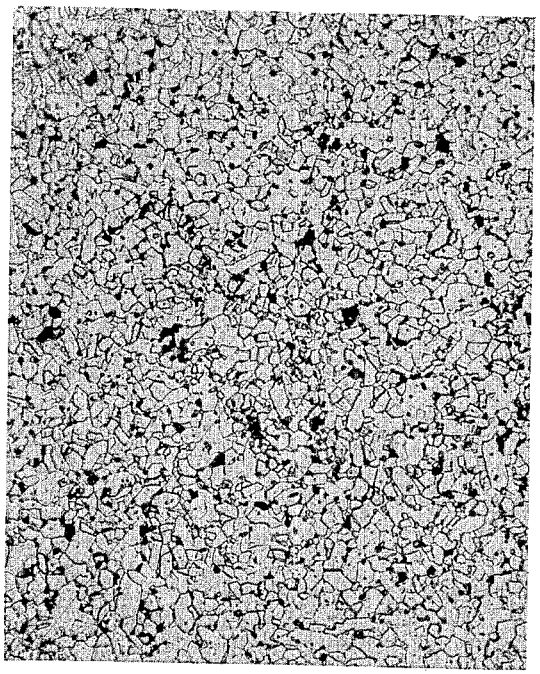
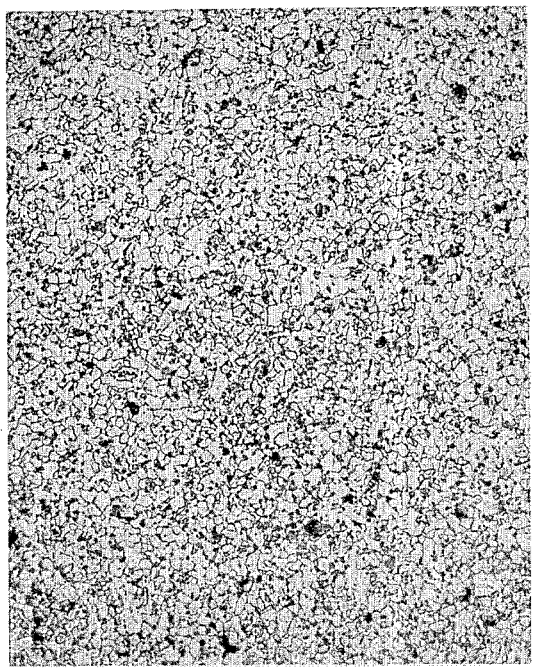
500X MAGNIFICATION
SAMPLE FIRED IN PLASMA FURNACE
HEATING RATE 2000°C/HR. TO 2325°C
3/4 HR. HOLD AT 2325°C
DENSITY 3.096
ATMOSPHERE – NITROGEN
FIG. 3

PLASMA ARC SINTERING OF SILICON CARBIDE

BACKGROUND OF THE INVENTION

This invention relates to an efficient process for the sintering of silicon carbide articles in a plasma gas atmosphere. Silicon carbide articles, produced in accordance with the invention, have superior qualities to prior art sintered articles.

Silicon carbide has several physical and chemical properties which make it an excellent material for high temperature, structural uses. Mechanically, silicon carbide is a hard, rigid, brittle solid which does not yield to applied stresses even at temperatures approaching its decomposition temperature. Because of its high thermal conductivity, silicon carbide is an excellent material for heat exchangers, muffle type furnaces, crucibles, gas-turbine engines and retorts in the carbothermic production and distillation of zinc Silicon carbide is also used in electrical resistance elements, ceramic tiles, boilers, around tapping holes, in heat treating, annealing and forging furnaces, in gas producers, and in other places where strength at high temperatures, shock resistance and slag resistance are required. Properties associated with silicon carbide refractory and ceramic materials are superior strength, high elastic modulus, high fracture toughness, corrosion resistance, abrasion resistance, thermal resistance, and low specific gravity.

Prior art sintering processes for silicon carbide, in general, tend to be inefficient and slow. Long furnace retention times are necessary when using conventional sintering processes, which results in poor energy utilization, excessive furnace gas consumption and high maintenance costs.

Many ceramic or refractory materials are sintered in prior art tunnel or periodic kilns which are fired by energy released from the combustion of fossil fuels with air or oxygen. If the ceramic or refractory material can be exposed to air and/or the products of combustion, then the kiln may be directly fired, in which case, the heating and utilization of energy may be reasonably efficient. However, sintering of silicon carbide should be performed in the absence of oxygen or oxygen-bearing gases, including water and carbon dioxide, to prevent formation of oxides, which may result in products having undesirable physical and chemical properties. Under such conditions, fossil fuel-fired furnaces may be used but the ceramic or refractory materials must be kept in a controlled environment, such as a retort, isolated from the combustion products of the fuel. Such heating is indirect, inefficient and slow. On a commercial scale, an apparatus such as a tunnel kiln requires about 70–90 hours (including the cooling cycle) to sinter silicon carbide refractory or ceramic materials.

Prior art electric kilns are more commonly used to sinter alpha silicon carbide ceramic or refractory articles under controlled atmospheres, but again tend to be energy inefficient and slow. In the case of a kiln equipped with graphite heating elements, the voltage can be controlled and the kiln can be heated to fairly high temperatures, yet there are several disadvantages: 1) The heating elements have a limited size, complex shape and must be kept under a strictly controlled atmosphere to maintain a long life; and 2) Furnace size is limited and it is difficult to achieve a uniform temperature in this type of kiln because the heating elements provide only radiant heat. Because of radiant heat transfer, as well as a heat element size limit, the kiln has a poor load density, a limited productivity and a poor energy efficiency. A typical sintering cycle time using a prior art electric kiln is about 24 hours (including cooling).

Plasma arc technology has recently been applied to the production of refractory and ceramic materials to reduce the furnace energy requirements and retention times. Plasma sintering of refractory and ceramic articles results in higher density and higher strength products than those made by conventional prior art processes.

Plasma arc fired gases differ greatly from ordinary furnace heated gases in that they become ionized and contain electrically charged particles capable of transferring electricity and heat; or, as in the case of nitrogen, become dissociated and highly reactive. For example, nitrogen plasma gas dissociates into a highly reactive mixture of $N_2$-molecules, N-atoms, $N^+$-ions and electrons. This dissociation or ionization greatly increases the reaction rates for sintering ceramic or refractory articles. Nitrogen, for example, which dissociates at about 5000° C. and one atmosphere pressure, would not dissociate under the normal furnace sintering conditions of about 1500° C.–2000° C. Thus, the use of plasma gases results in a highly reactive environment, which greatly increases the reaction sintering rate.

Plasma arc technology has generally only been used for the fusion of high temperature materials and not for sintering or reaction sintering. This is because the required sintering temperature for most ceramic or refractory materials is usually less than 2500° C., whereas the average temperature of gases heated with a plasma arc torch is above 4000° C. At such high temperatures, the refractory or ceramic materials may decompose. For example, U.S. Pat. No. 3,432,296, entitled "Plasma Sintering," to McKinnon et al, discloses a process for sintering refractory oxide materials at temperatures of less than 1650° C. using radio frequency electromagnetic energy to generate the plasma gas.

However, a plasma gas can be superheated to effect ionization or dissociation, while the ceramic or refractory material is then directly heated by this preheated gas to a much lower temperature. For example, nitrogen plasma gas heated to about 3000° C. will bring silicon carbide refractory articles up to a temperature of 1000° C.–1600° C. in two to eight hours; and nitrogen plasma gas heated to about 4000° C. will bring the articles up to a temperature of 1900° C.–2200° C. in the same time period. Thus, a plasma gas may be heated to a much higher temperature than the sintering temperature required, depending on furnace geometry, plasma input power and load density.

SUMMARY OF THE INVENTION

This invention relates to a process for the sintering of silicon carbide refractory or ceramic articles using plasma arc gases. Use of the process of the invention results in a reduced cycle time and a high furnace productivity.

In accordance with the process of the present invention, shaped silicon carbide green bodies are formed from silicon carbide particles, by methods common to the art. Most preferably, alpha, non-cubic crystalline silicon carbide particles are used in the green body mixture. The formed green articles are then placed into a furnace. Oxygen-bearing gases, which may form undesirable oxides with the silicon carbide, should be removed from the furnace prior to sintering. Likewise, an oxygen-free gas should be used for the sintering process. Plasma arc gases heat the silicon carbide articles to a sintering temperature of 2000° C.–2500° C. at a heating rate of 300° C./hr–2000° C./hr. The articles are held at the sintering temperature for 0.1–2 hours, then are preferably cooled at a cooling rate of 300° C./hr–2000° C./hr. The total cycle time for the process of the invention, including cooling and loading, is about 1.5–20 hours.

There are various plasma gas enthalpies (BTU/lb) and sintering temperatures depending on which gas is used in the sintering process. For example, when nitrogen is used as the plasma gas in the process of the invention, the nitrogen plasma gas enthalpy is 2000 BTU/lb–4000 BTU/lb, with a preferred enthalpy of 3000 BTU/lb; and the nitrogen plasma gas temperature is 4000° C.–6000° C., with a preferred nitrogen gas temperature of 5000° C. When argon is used as the plasma gas, the argon plasma gas enthalpy is 700 BTU/lb–1200 BTU/lb and the argon plasma gas temperature is 4000° C.–6000° C. The preferred sintering temperature when nitrogen is used as the plasma gas is 2325° C. When argon is used as the plasma gas, the torch efficiency is substantially lowered, and the sintering temperature is about 100° C. lower than when nitrogen is used. Thus, the preferred sintering temperature when argon is used as the plasma gas is 2200° C.

Most preferably, nitrogen is used as the plasma gas; the nitrogen plasma gas enthalpy is about 3000 BTU/lb; the silicon carbide article is heated from a temperature of about 20° C. to the sintering temperature of 2325° C. at a heating rate of 1000° C./hr for 2.3 hours; held at the sintering temperature of 2325° C. for 0.75 hours; cooled to 1500° C. for one hour; and cooled to 300° from 1500° for 2.5 hours. Loading time takes approximately 0.5 hours, making the preferred total cycle time about seven hours. The preferred heating rate greatly depends on the thickness of the silicon carbide article being sintered; thicker articles require lower heating rates than thinner articles.

Use of plasma arc gases, in accordance with the process of the present invention, results in increased reaction rates because of a higher heat transfer rate. Higher reaction rates yield higher energy efficiencies, lower retention times, and higher kiln productivities.

This process is useful for sintering standard refractory or ceramic silicon carbide shapes or for complex shapes such as backplates, rotors, scroll assemblies and nozzles. Use of the process of this invention results in a product with a high density, high strength, high corrosion resistance, and dimensional stability.

Accordingly, it is an object of the present invention to provide a process for sintering silicon carbide ceramic or refractory articles which is inexpensive and efficient.

It is a further object of the present invention to provide a process for sintering ceramic or refractory articles which results in a reduced cycle time and thus a high furnace productivity.

It is yet a further object of this invention to provide a process which can be utilized for in the sintering of complex shaped silicon carbide refractory and ceramic articles.

A further object of this invention is to provide a process for sintering silicon carbide articles which results in consistent, uniform and superior quality products.

Other objects and further scope of applicability of the present invention will become apparent from the detailed description to follow, taken in conjunction with the accompanying drawing.

BRIEF DESCRIPTION OF THE DRAWING

FIG. 1 is a photograph of the microstructure of silicon carbide, magnified 500 times, having a product density of 3.13 g/cm$^3$, produced by firing a sample in a prior art Centorr TM furnace in an argon atmosphere, heating the sample to 2150° C. at a heating rate of 250° C./hr, and holding the sample at 2150° C. for 1.5 hours;

FIG. 2 is a photograph of the microstructure of silicon carbide, magnified 500 times, having a density of 3.15, produced in accordance with the invention by firing a sample in a plasma furnace in a nitrogen atmosphere, heating the sample to 2325° C. at a heating rate of 800° C./hr, and holding the sample at 2325° C. for 1.5 hours.

FIG. 3 is a photograph of the microstructure of silicon carbide, magnified 500 times, having a density of 3.10, produced in accordance with the invention by firing a sample in a plasma furnace in a nitrogen atmosphere, heating the sample to 2325° C. at a heating rate of 2000° C./hr, and holding the sample at 2325° C. for 0.75 hours;

DESCRIPTION OF THE PREFERRED EMBODIMENT

Figure 4:
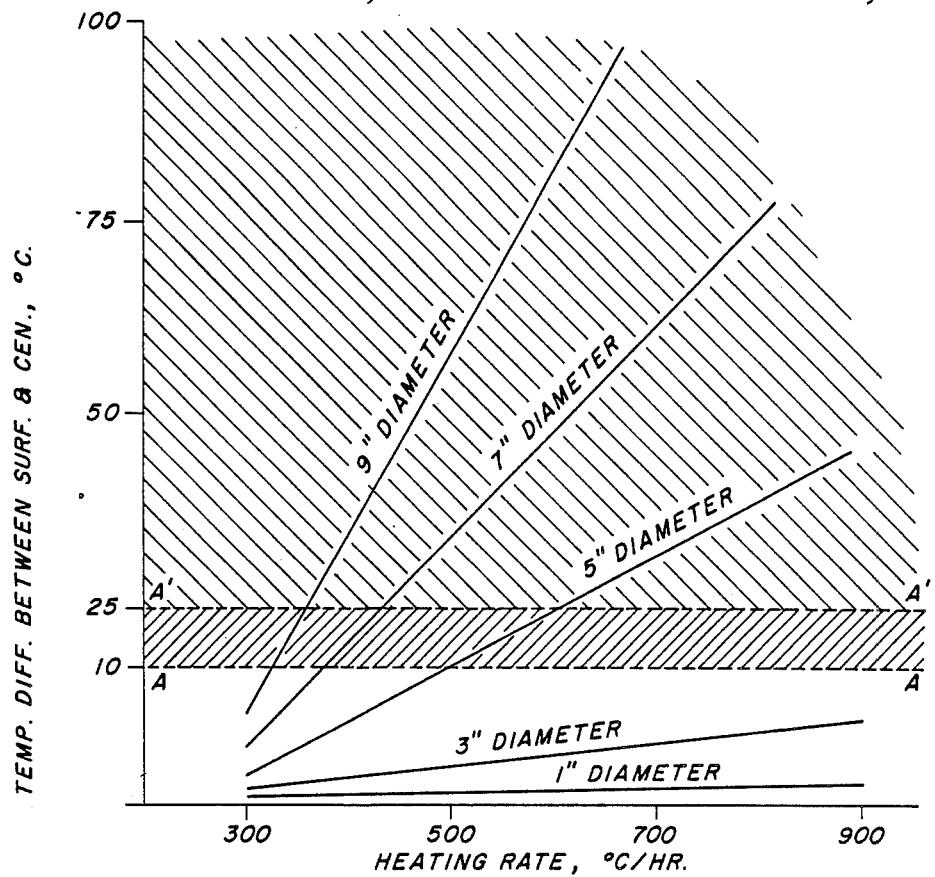
FIG. 4 is a graph of the effect of different heating rates on the calculated difference between surface and center temperatures for various diameter silicon carbide articles sintered in accordance with the invention.

At the outset, the invention is described in its broadest overall aspects, with a more detailed description following. This invention relates to a process for sintering silicon carbide refractory or ceramic articles using plasma arc gases. The process of the invention has a reduced sintering cycle time and results in superior quality products. In the process of the invention, articles are formed from silicon carbide particles and then sintered in a plasma fired furnace. The silicon carbide articles are heated by plasma gases at a heating rate of 300° C./hr–2000° C./hr, to a sintering temperature of 2000° C.–2500° C., held at the sintering temperature for 0.1–2 hours, and cooled at a cooling rate of 300° C./hr–2000° C./hr. If nitrogen is used as the plasma gas, the plasma gas enthalpy is 2000 BTU/lb–4000 BTU/lb. If argon is used as the plasma gas, the plasma gas enthalpy is 700 BTU/lb–1200 BTU/lb.

The green silicon carbide articles are formed by any means, common to the art. Preferably, the silicon carbide articles are formed from alpha, non-cubic crystalline silicon carbide, although any alpha, beta or amorphous silicon carbide, or mixtures thereof, may be utilized in the green body mixture. Small amounts of boron, carbon, or other additives may be included in the green body mixture depending on product requirements. Suitable green body mixtures are disclosed in U.S. Pat. No. 4,179,299, entitled "Sintered Alpha Silicon Carbide Ceramic Body Having Equiaxed Microstructure," to Coppola et al.

The formed silicon carbide articles are then placed into a furnace for sintering. Preferably, oxygen-bearing gases are removed from the furnace prior to sintering to prevent the formation of oxides which may have undesirable physical and chemical properties. These gases may be removed by evacuating the furnace or by flushing the furnace with an oxygen-free gas, such as nitrogen. It is also preferable to use an oxygen-free gas for the sintering process, so that oxides will not be produced. The preferred gases for sintering of silicon carbide are nitrogen, argon, helium, hydrogen and/or neon, however, any plasma gas may be used in accordance with the present invention, depending upon sintering requirements.

In accordance with the invention, the silicon carbide articles are heated by a plasma gas to a sintering temperature of 2000° C.–2500° C. at a heating rate of 300° C.–2000° C./hr, held at the sintering temperature for 0.1–2.0 hours, and cooled. Other operating parameters which are useful for the process of the invention are a cooling rate of 300° C./hr–2000° C./hr, a furnace load density of 3–30 lbs/ft$^3$, and a total cycle time (including cooling and loading) of about 1.5–20 hours.

If nitrogen gas is used as the plasma gas in the process of the invention, the plasma gas enthalpy is 2000 4000 BTU/lb, with a preferred enthalpy of 3000 BTU/lb. This is equivalent to a nitrogen plasma gas temperature of 4000° C.–6000° C., and a preferred nitrogen plasma gas temperature of 5000° C. If argon is used as the plasma gas, the plasma gas enthalpy is 700 BTU/lb–1200 BTU/lb, and the plasma gas temperature is 4000° C.–6000° C. When argon is used as the plasma gas, the torch efficiency is lowered, and the sintering temperature is about 100° C. lower than when nitrogen is used. The preferred sintering temperature when nitrogen is used as the plasma gas is 2325° C.; when argon is used, the preferred sintering temperature is 2200° C. Sintering temperatures and plasma gas enthalpies will vary depending on which plasma gas is utilized in the process of the invention.

The most preferable furnace operating conditions for one cycle of the process of the invention, including cooling and loading are as follows:

(1) Heat a formed silicon carbide article at a heating rate of 1000° C./hr for 2.3 hours, using nitrogen plasma gas having an enthalpy of 3000 BTU/lb, up to a sintering temperature of 2325° C.;

(2) Hold the article at the sintering temperature of 2325° C. for 0.5 hours;

(3) Cool the article to a temperature of 1500° C. for one hour (cooling rate of 825° C./hr);

(4) Further cool the article to 300° C. from 1500° C. for 2.5 hours (cooling rate of 480° C./hr); and (5) Change the furnace load for 0.5 hours. This preferred process cycle results in a total cycle time of about seven hours. The preferred furnace green load density based on article weight is 10 lbs/ft$^3$, but furnace load density varies depending on the shape complexity of the silicon carbide articles. The heating and cooling rates are also highly dependent on the shape of the silicon carbide articles; thicker articles require slower heating and cooling rates than thinner articles. Total energy requirements are approximately 5–9 kwh/lb for the preferred cycle time of seven hours. For comparison, typical prior art electric kiln operating parameters are: greater than 20 hours total cycle time; a heating rate of less than 300° C./hr; an energy requirement of 30–40 kwh/lb; and a green load density of 3–8 lb/ft$^3$.

Other inventions which are useful in practicing the process of the present invention are copending patent applications, Ser. No. 718,376 entitled PLASMA HEATED SINTERING FURNACE, to Jonathan J. Kim et al, and Ser. No. 718,374 entitled SYSTEM FOR PREVENTING DECOMPOSITION OF SILICON CARBIDE ARTICLES DURING SINTERING, to Joel D. Katz et al, filed on even date herewith, the teachings of which are incorporated herein by reference. Ser. No. 718,376 discloses a plasma heated furnace and method for sintering refractory or ceramic materials. In a preferred embodiment, the furnace comprises at least two plasma torch inlets, positioned asymmetrically through the walls of the sintering chamber, with one plasma torch inlet positioned near the top of the sintering chamber, the other plasma torch inlet positioned near the center of the furnace, and the exhaust outlet positioned near the bottom of the sintering chamber. Ser. No. 718,374 discloses a process for the sintering of silicon carbide refractory or ceramic articles in a plasma heated furnace, wherein decomposition of the silicon carbide article is prevented by the use of covered crucibles, strategic placement of the plasma torches and exhaust outlet, and/or the use of a "sacrificial" body of silicon carbide which decomposes before the silicon carbide article being sintered.

FIGS. 1, 2 and 3 of the drawing are photographs of the microstructure of sintered silicon carbide, magnified 500 times. FIG. 1 shows silicon carbon produced in a prior art Centorr ™ furnace (500× magnification). The silicon carbide was fired in an argon atmosphere, heated to a temperature of 2150° C. at a heating rate of 250° C./hr, and held at the sintering temperature of 2150° C. for 1.5 hours. The product density was 3.13 g/cm$^3$. FIG. 2 shows silicon carbide produced in accordance with the invention in a plasma furnace (500× magnification). The silicon carbide was fired in a nitrogen atmosphere, heated to a temperature of 2325° C. at a heating rate of 800° C./hr, and held at the sintering temperature of 2325° C. for 1.5 hours. The product density was 3.14 g/cm$^3$. FIG. 3 shows silicon carbide produced in accordance with the invention in a plasma furnace (500x magnification). The silicon carbide was fired in a nitrogen atmosphere, heated to a temperature of 2325° C. at a heating rate of 2000° C./hr, and held at the sintering temperature of 2325° C. for 0.75 hours. The product density was 3.10 g/cm$^3$. Note that in FIG. 1 the grains are large and some are elongated. This is compared with FIG. 2 which shows much smaller grains and no elongation of grains. FIG. 3 shows even smaller-sized grains which are approximately two to three microns. Fine, equiaxed grains are desirable in a product to give it high strength, high fracture toughness, and high corrosion resistance.

FIG. 4 of the drawing is an illustration of the effects of various heating rates on the calculated temperature difference between the surface and center of various diameter articles produced in accordance with the invention. The preferred operating range for the present invention is represented by the band between A and A' in FIG. 4. The area in and underneath the band represents a range in which products will have a high density. The area above the band represents a range in which products may have warpage and breakage. FIG. 4 shows that the fast heating rates of the invention do not cause product warping if the diameter does not exceed about three inches.

Figure 5:
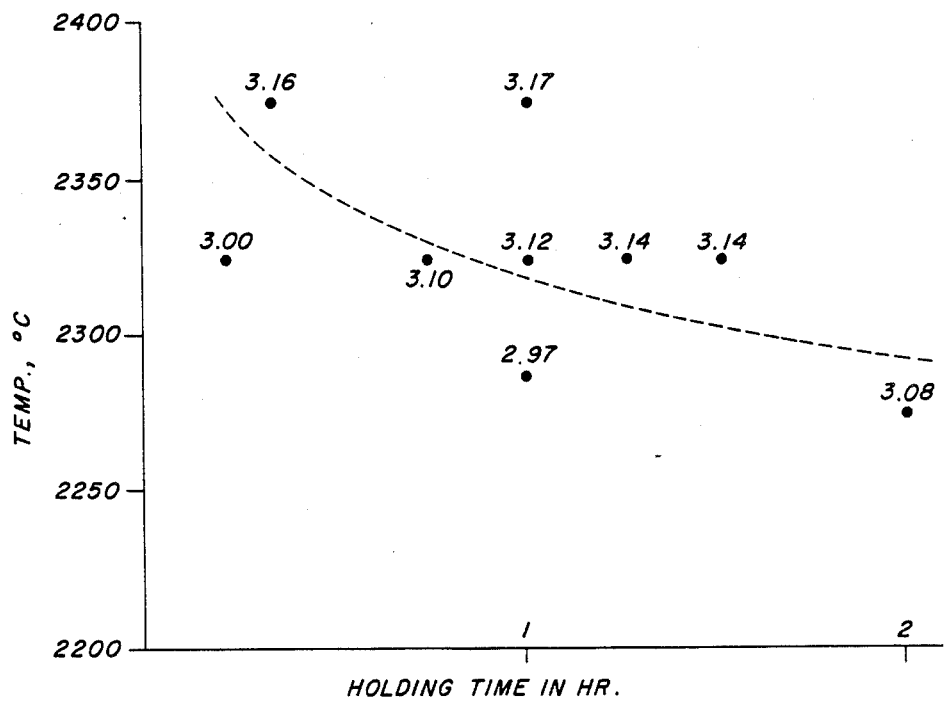
FIG. 5 is a graph of the effects of holding times and sintering temperatures on the density of a silicon carbide article produced in accordance with the invention.

FIG. 5 of the drawing is an illustration of the effects of various sintering temperatures and holding times on the density of a silicon carbide article, produced in accordance with the invention. The product density is found to increase with an increase in holding time and/or an increase in sintering temperature.

The invention is further illustrated by the following non-limiting examples in which silicon carbide was formed into green shapes, placed into a furnace, and fired in accordance with the present invention.

EXAMPLES 1-11

Silicon carbide articles were sintered at varying temperatures, heating rates, and holding times to determine the effects on product density. Results are shown in Table 1 and FIG. 5.

TABLE 1
Effects of Heating Rate and Holding Time on Density

| Example | Heating Rate °C./hr | Temperature °C. | Time hr | Density g/cm$^3$ |
|---|---|---|---|---|
| 1 | 300 | 2275 | 2.00 | 3.08 |
| 2 | 300 | 2288 | 1.00 | 2.97 |
| 3 | 300 | 2325 | 0.25 | 3.00 |
| 4 | 300 | 2325 | 0.75 | 3.10 |
| 5 | 300 | 2325 | 1.00 | 3.12 |
| 6 | 800 | 2325 | 0.50 | 3.14 |
| 7 | 900 | 2325 | 0.75 | 3.14 |
| 8 | 1200 | 2325 | 0.50 | 3.11 |
| 9 | 1500 | 2325 | 0.75 | 3.12 |
| 10 | 300 | 2375 | 0.25 | 3.16 |
| 11 | 300 | 2375 | 1.00 | 3.17 |

Comparing Examples 3-9, which were all at the preferred sintering temperature of 2325° C., the product density was found to increase slightly as the sintering holding time and heating rates were increased. Examples 1 and 3 show the effects of a low sintering temperature with a long sintering time (Example 1 and a high sintering temperature with a short sintering time (Example 3). All of the densities were acceptable, compared to prior art product densities, regardless of the heating rate. The heating rates utilized in the process of the invention, however, were much higher than prior art process heating rates.

EXAMPLES 12-16

Silicon carbide articles were sintered at varying sintering temperatures and holding times to determine the effects on product grain size. The results are shown in Table 2.

TABLE 2
Effect of Sintering Temperature and Holding Time on Grain Size

| Example | Run # | Temperature °C. | Time (hr) | Grain Size (microns) |
|---|---|---|---|---|
| 12 | 1 | 2275 | 2.0 | 4.97 |
| 13 | 5 | 2325 | 1.0 | 4.86 |
| 14 | 12 | 2325 | 1.5 | 5.4 |
| 15 | 3 | 2375 | 0.25 | 7.2 |
| 16 | 5 | 2375 | 1.0 | 5.2 |

In general, a grain size of less than about 5 microns is desirable for silicon carbide articles; this grain size is achieved by the process of the invention at a sintering time of less than one hour.

Accordingly, a process has been provided for the sintering of silicon carbide articles which has a reduced cycle time, is energy efficient, results in a high kiln productivity and produces a superior product.

Although the invention has been described with reference to its preferred embodiment, other embodiments can achieve the same results. Variations and modifications of the present invention will be obvious to those skilled in the art and it is intended to cover in the appended claims all such modifications and equivalents.

We claim:

1. A process for sintering a formed silicon carbide article using a plasma heated gas comprising the following steps:
    (a) Heating the silicon carbide article by a plasma heated gas to a sintering temperature of 2000° C. to 2500° C., at a heating rate of 300° C./hr to 2000° C./hr wherein the temperature difference between the surface and center of the silicon carbide article is less than or equal to 25° C.; and
    (b) Holding the article at the sintering temperature for 0.1 hour to 2 hours.

2. A process in accordance with claim 1 wherein the plasma heated gas is nitrogen.

3. A process in accordance with claim 2 wherein the nitrogen plasma gas has an enthalpy of 2000 BTU/lb to 4000 BTU/lb.

4. A process in accordance with claim 3 wherein the preferred nitrogen plasma gas enthalpy is 3000 BTU/lb.

5. A process in accordance with claim 2 wherein the nitrogen plasma gas temperature is 4000° C. to 6000° C.

6. A process in accordance with claim 5 wherein the preferred nitrogen plasma gas temperature is 5000° C.

7. A process in accordance with claim 2 wherein the preferred sintering temperature is 2325° C.

8. A process in accordance with claim 1 wherein the plasma heated gas is argon.

9. A process in accordance with claim 8 wherein the argon plasma gas has an enthalpy of 700 BTU/lb-1200 BTU/lb.

10. A process in accordance with claim 8 wherein the argon plasma gas temperature is 4000° C. to 6000° C.

11. A process in accordance with claim 8 wherein the preferred sintering temperature is 2200° C.

12. A process in accordance with claim 1 further comprising the step of cooling the article at a rate of 300° C./hr to 2000° C./hr.

13. A process in accordance with claim 12 wherein the total cycle time, including cooling and loading, is 1.5 hours to 20 hours.

14. A process in accordance with claim 1 wherein the the green load density is 3 lbs/ft$^3$ to 30 lbs/ft$^3$.

15. A process in accordance with claim 14 wherein the preferred green load density is 10 lbs/ft$^3$.

16. A process in accordance with claim 1 wherein the silicon carbide is alpha silicon carbide.

17. A sintered silicon carbide article produced in accordance with the process of claims 1 or 16.

* * * * *